May 17, 1955
G. C. PEARCE
2,708,709
DOMESTIC APPLIANCE
Filed March 16, 1954
2 Sheets-Sheet 1
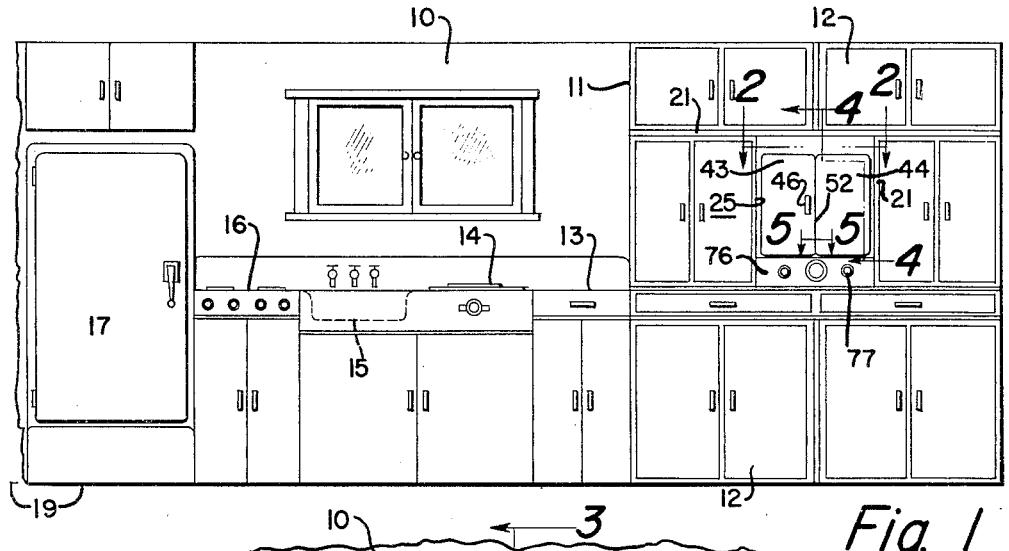
Fig. 1
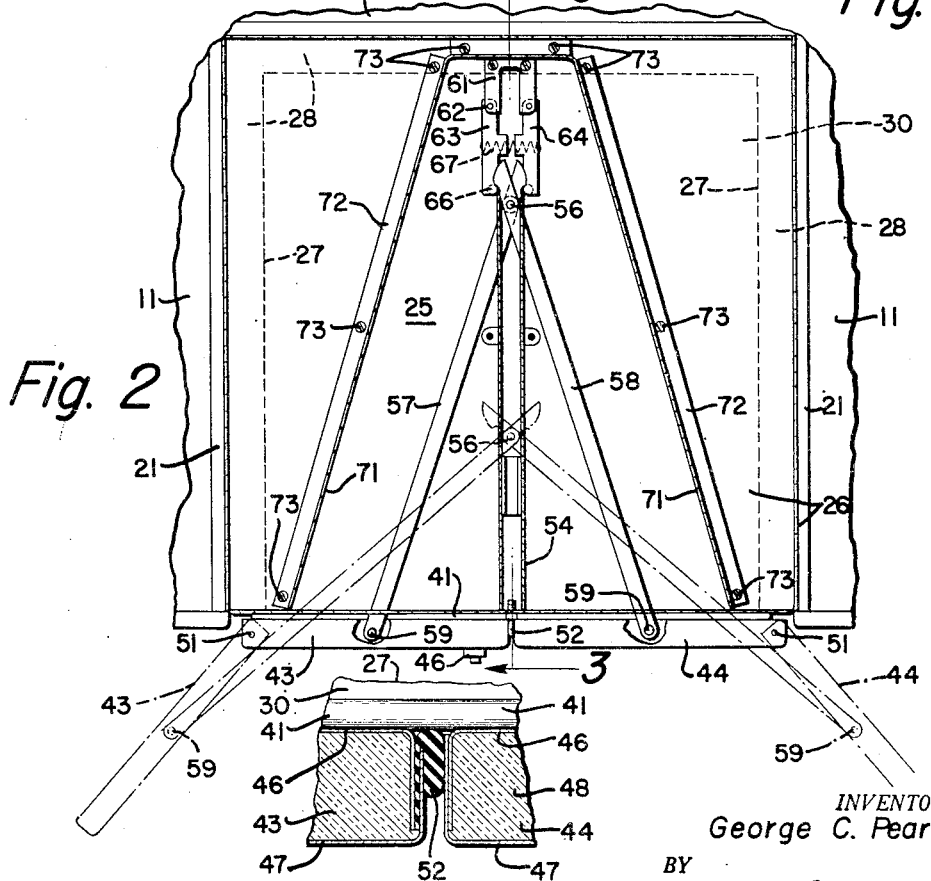
Fig. 2
Fig. 5
INVENTOR.
George C. Pearce
BY
R. R. Condon.
His Attorney.

May 17, 1955
G. C. PEARCE
2,708,709
DOMESTIC APPLIANCE
Filed March 16, 1954
2 Sheets-Sheet 2
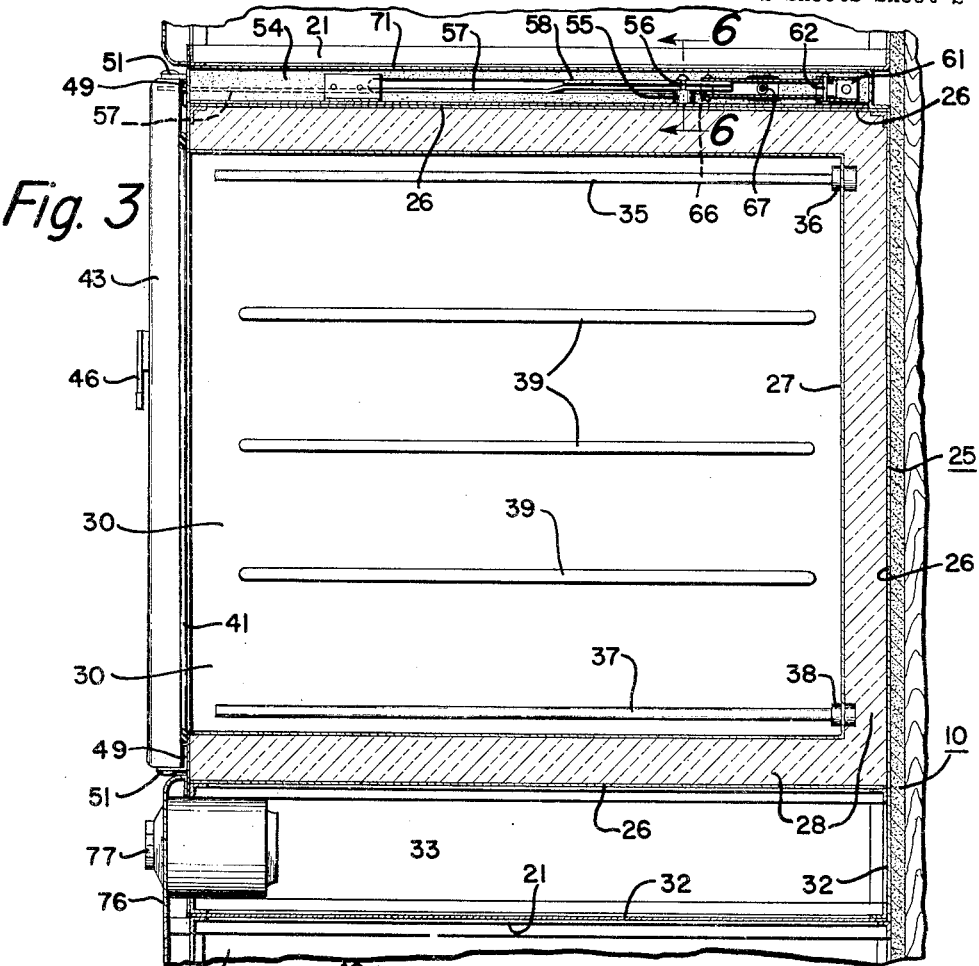
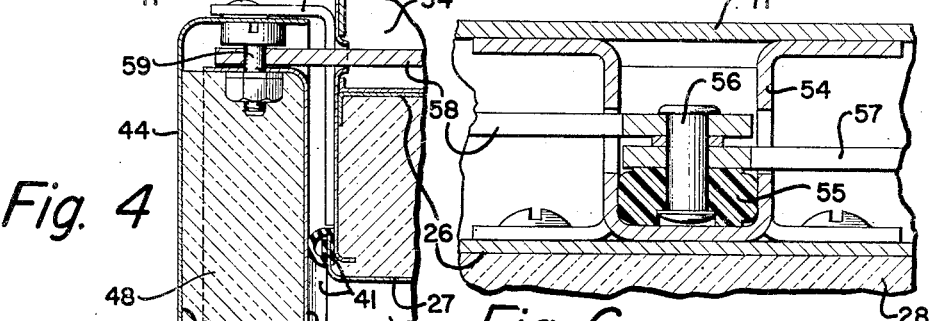
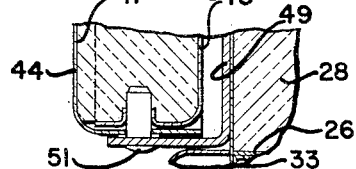
INVENTOR.
George C. Pearce
BY
R. R. Candor
His Attorney

United States Patent Office 2,708,709
Patented May 17, 1955

2,708,709

DOMESTIC APPLIANCE

George C. Pearce, Dayton, Ohio, assignor to General Motors Corporation, Detroit, Mich., a corporation of Delaware Application March 16, 1954, Serial No. 416,498

2 Claims. (Cl. 219—35)

This invention relates to cooking ovens and particularly to self-contained wall-mounted ovens.

Some housewives and cooks, for various reasons, prefer that a cooking or baking oven be located on a wall of a room or kitchen or mounted in a cavity of a cupboarded wall structure in the kitchen at a substantial distance above the floor thereof and separate from a hot plate appliance or top cooking surface of a range as distinguished from an oven incorporated in the lower portion of the construction of a range cabinet. This preference is predicated upon the fact that conventional or prior locations of baking ovens has presented many difficulties, objections and hazards. One of the more important reasons for such preference is that bending or stooping of a housewife or cook in examining or adding seasoning to foods being cooked in an oven is eliminated. A further reason for such preference is that an oven located at a low level requires a housewife or cook to assume unnatural or awkward postures in gaining access to the interior of the oven and is more likely to cause her to spill or drop articles of food from receptacles containing the same and being placed in or removed from the oven. I therefore contemplate locating a cooking or baking oven in or on a wall of a room such as a kitchen with the lower portion of the oven disposed a considerable distance above the kitchen floor at substantially waist height of a person so as to meet the preference aforesaid.

An object of my invention is to provide an improved location for a self-contained unitary oven assembly or structure which will facilitate use thereof by a housewife or cook and will overcome objections, difficulties and hazards encountered in the use of an oven within a range cabinet.

Another object of my invention is to locate or mount a cooking or baking oven on a wall or in a cavity of a cupboarded wall structure of a kitchen at substantially waist height of a person so as to prevent stooping of such person to gain access to or to view the contents of the oven and to eliminate the flow of hot air from the oven against the person's face or body when the oven is opened.

In carrying out the foregoing objects it is a further object of my invention to provide an insulated self-contained wall-mounted oven with a double door or side by side horizontally swinging doors normally closing the access opening thereof with a device for simultaneously opening and/or closing both of the doors and for biasing the doors into engagement with the oven upon closure thereof wherein this device is connected with the doors at a point laterally beyond the seal of the doors with the oven and all parts thereof are insulated, by the insulated walls of the oven, from the high temperature within the oven for preventing warpage and binding of the parts.

Further objects and advantages of the present invention will be apparent from the following description, reference being had to the accompanying drawings wherein a preferred form of the invention is clearly shown.

In the drawings:

Figure 1 is a view looking toward a cupboarded wall of a kitchen on or in which a self-contained baking oven of the present invention is mounted;

Figure 2 is a fragmentary sectional view taken on the line 2—2 of Figure 1 showing a biasing device for the oven doors located outside and beyond insulated walls of the oven;

Figure 3 is a fragmentary vertical sectional view taken on the line 3—3 of Figure 2 showing elements of the oven structure partly in section and partly in elevation;

Figure 4 is a broken fragmentary sectional view taken on the line 4—4 of Figure 1 showing a connection of the oven door biasing device with a door and the pivotal mounting of a door upon the oven structure;

Figure 5 is a fragmentary sectional view taken on the line 5—5 of Figure 1 showing a gasket on one of the oven doors for sealing the joint between mating edges of the doors, and;

Figure 6 is a sectional view taken on the line 6—6 of Figure 3 showing a roller means connection of the door operating arms.

Referring to the drawings I show in Figure 1 thereof one wall 10 of a room or kitchen including a cupboarded wall section 11 having incorporated or built therein or thereagainst a unitary structure having suitable partitions and doors dividing this wall section into a plurality of utility storage spaces or cupboards 12. The cupboarded wall section 11 of kitchen wall 10 may be located at one side of a unitary cabinet comprising a substantially waist high work ledge 13, a dishwasher 14, a sink 15 and an electric hot plate cooker 16 provided with surface heating elements. This unitary and stationary cabinet is of usual or conventional design as is customary in kitchen equipment and may include closets below the waist high top surface thereof. A mechanically refrigerated refrigerator cabinet 17 is disposed adjacent the surface cooker 16. The floor of the kitchen is indicated at 19 and it will be noted that the cupboards 12 extend continuously from the floor 19 of the kitchen to the ceiling thereof while the work ledge 13, dishwasher 14, sink 15 and the cooker 16 are at substantially waist height of a person in a standing position on the kitchen floor 19. As before stated the cupboarded wall section 11 of kitchen wall 10 is provided with suitable partitions and supports for the cupboards and drawers and a pocket or cavity is provided in a portion of this wall by suitable metal partitions or dividers 21 (see Figures 2 and 3) of a size suitable to receive or have inserted therein a self-contained unitary insulated assembly including a baking oven of the character constructed in accordance with my invention. The front of this self-contained assembly or unit is substantially flush with the front of the wall section 11 or the cupboards therein. In defining the self-contained oven unit or assembly it is to be understood that I mean an oven which is equipped with all the essential elements for rendering the same operable to cook or bake foods placed therein under suitable timer controls, switches, heating elements and wherein the oven is insulated to effectively retain heat therein. In this respect the oven assembly or structure herein disclosed is to be distinguished from an oven in the lower part of a range and from a baking box or the like removably positioned on surface burners of kitchen ranges. The present oven is preferably electrically heated so that all that is required to be provided for its installation in the cavity of the cupboarded wall is an electric outlet connected to a source of electric current supply for plugging a cable leading from the oven or its controls into this outlet.

The self-contained wall-mounted electric cooking or baking oven of the present disclosure, located in the cavity of wall section 11 of kitchen wall 10, includes a box-like structure generally represented by the reference character 25 comprising a metal skeleton frame, outer metal walls 26 secured thereto, a porcelain enameled metal liner 27, within and spaced from outer walls 26, and any suitable or conventional insulating material 28 disposed in the space between liner 27 and walls 26. Liner 27 forms the top, bottom, back and upright side walls of an oven 30 (see Figure 3) within the insulated box-like structure 25. The frame and the outer metal walls 26 of box-like structure 25 depend or extend downwardly of or beyond the insulated oven bottom wall to provide walls 32 of a compartment 33 therebelow. An electric broil heating element 35 (see Figure 3), of any suitable or conventional type, is located in the upper part of oven 30 and plugs into a receptacle 36 mounted upon the oven rear wall. A second electric heating element 37, of any suitable or conventional construction, is located in the lower part of oven 30 and plugs into a receptacle 38 also mounted upon the oven rear wall. The electric heating elements 35 and 37, when energized form means for heating the interior of oven 30 to a high temperature for cooking or baking foods placed therein. Upright side walls of oven liner 27 are provided with horizontally elongated and vertically spaced apart embossations 39 forming supports for shelves in the oven adapted to receive pans or receptacles of food to be cooked. The front of oven 30 is provided with an access opening formed by spaced apart and overlapping front edges of walls 26 and liner 27. These overlapping edges of walls 26 and liner 27 have a gasket 41 locked therebetween and extending continuously around the oven access opening for engagement by doors for closing and sealing the oven access opening. Gasket 41 is preferably formed of fiberglass or silicon rubber composition in order to withstand high heat generated within oven 30. The oven access front opening is normally closed, by a double door arrangement or two side by side horizontally swingable doors 43 and 44. A knob or handhold 46 is provided on at least one of the doors for applying a horizontal force thereto so as to swing both doors 43 and 44 simultaneously in a horizontal direction as will be more fully described hereinafter.

Doors 43 and 44 may be of any suitable or conventional construction and such doors ordinarily include an inner metal pan 46 (see Figures 4 and 5) and an outer metal pan 47 secured together in any well known manner with suitable insulating material 48 disposed therebetween. Upper and lower hinge brackets 49 are welded or bolted to the box-like structure 25 and have a vertically disposed hinge pin 51 (see Figure 4) formed integrally thereon or welded thereto. The top and bottom edge portions of doors 43 and 44 are provided with openings for receiving the hinge pins 51 to pivotally mount the doors to opposite sides or opposed upright sides of oven 30 of the structure 25. A fiberglass or silicon rubber gasket 52 has a mounting portion locked between the secured together pans 46 and 47 of door 43 at its mating edge with door 44 and has a sealing bead portion extending along the mating edge of door 43 (see Figure 5). The ends of gasket 52 terminate closely adjacent to or in overlapping engagement with gasket 41 at the front of oven 30. The bead portion of door gasket 52 snugly engages the mating edge of each door 43 and 44 when these doors are closed to seal the joint therebetween, which is exposed to the interior of oven 30, to prevent escape of hot air from the oven at this exposed joint.

As before stated the oven doors 43 and 44 are swung horizontally about their pivotal mountings, pins 51, simultaneously when a horizontal force is imparted to the handle or knob 46 on door 43. In order to accomplish this I provide a movable interlock connection between the doors 43 and 44 in the form of a device which is located wholly outside oven 30 and is connected with doors 43 and 44 laterally beyond the point where the doors sealingly engage the oven access opening gasket 41 and beyond the outer top wall 26 of the insulated oven box-like structure 25. By so locating the movable interlock device elements thereof are insulated, by the insulating material 28, from the high heat within oven 30 and are thus prevented from warping and binding or becoming deteriorated. The movable interlock device includes a sheet metal channel-shaped member 54 stationarily secured, by screws or the like, to a top edge part of the front and top portions of outer metal walls 26 of the structure 25 (see Figures 2 and 6). The channel part of member 54 forms a longitudinal track or guide across the top of structure 25 for receiving and guiding roller 55 on a pin 56 which pin also passes through a rear part of two arms or links 57 and 58 and is riveted over to tie these arms or links together. These arms or links 57 and 58 extend through a suitable elongated slot provided in the upright walls of member 54 (see Figure 6) and their forward ends project through suitable slots provided therefor in the front wall of structure 25 and are connected to doors 43 and 44 respectively by bolts or the like 59 (see Figure 4). Suitable stop means may be located at a forward point along the track or guide of channel member 54 for engagement by roller 55 to prevent swinging of doors 43 and 44 beyond a desired open position. A bracket 61 at the rear of channel 54 has pins 62 extended therethrough and pivotally connecting one end of opposed jaws 63 and 64 thereto. The other end of each jaw 63 and 64 has a roller 66 mounted thereon and a spring 67, having its ends secured to jaws 63 and 64, normally applies a force to the jaws in a directions tending to pull their free ends toward one another. The pulling effect of spring 67 forces rollers 66, on jaws 63 and 64, into engagement with cam means formed on the rear end of arms or links 57 and 58 together therewith provide means, rendered effective by closing the doors 43 and 44, for biasing the doors into their normal closed or sealing engagement with gasket 41 at the front portion of oven 30. In order to enclose elements of the door operating and biasing device just described I provide a removable sheet metal cover 71 therefor. Cover 71 includes flange portions 72 secured to the box-like structure 25 by a plurality of screws 73 (see Figure 2) threaded into the outer top metal wall 26 thereof. This cover or enclosure 71 prevents foreign objects or articles from falling into contact with the door operating and biasing device and thus eliminates any danger of this device becoming inoperative.

The compartment 33 beneath oven 30 houses suitable controls and switches for the electric oven heating elements 35 and 37 which are connected by lead wires in any conventional and well known manner to the receptacles 36 and 38 for these elements respectively. For example compartment 33 is provided with, in addition to its other enclosing walls 32, a front preferably removable or detachable wall or panel 76 (see Figure 3) upon which suitable manually actuated electric switches and an electric chronometric or timer control are mounted. Each switch and the timer control has an actuator shaft or similar element projecting therefrom and extended through front wall or panel 76 of compartment 33. Proper setting means is provided on the dial of the timer control so as to be accessible from the exterior of the box-like structure 25 and a rotatable knob or the like 77 located outside panel 76 is secured upon the shaft of the electric switches. The electric circuit and the controls for energizing and deenergizing the heating means or elements 35 and 37 form no part of the present invention and may be conventional to cause heating of the interior of oven 30 to a high temperature, in the neighborhood of 400° F., for a timed interval. Such elements are shown in the present disclosure to emphasize the fact that the wall mounted oven is a self-contained unitary assembly complete in itself for carrying out a baking operation, after having been installed in the cavity of the cupboarded wall structure or section 11 of wall 10 of the kitchen.

The present arrangement is such that the inner bottom wall of oven 30 is located or disposed, a considerable distance above floor 19 of the kitchen or room, at substantially waist height of a person whereby when the doors 43 and 44 of the oven assembly are opened the entire interior of oven 30 may be viewed through its access opening by the person in a standing position on floor 19. By again referring to Figure 1 of the drawings it will be noted that the bottom insulated wall of oven 30 is located only slightly above the level of the height of work ledge 13, sink 15 and cooker 16 and that this is a distinguishing feature from an oven located below a cooking top of an electric range. When the knob or handhold 46 on door 43 is grasped by the hand of the user of structure 25 and pulled forwardly of the front thereof a horizontally swinging movement is imparted to door 43. The initial movement of door 43 causes the cammed rear ends of both links or arms 57 and 58, due to these arms being tied to one another by pin 56, to move forwardly away from rollers 66, on the biasing jaws 64, and be released therefrom. Roller 55, on pin 56, rolls toward the front of oven 30 in the track or guide, provided by channel member 54, and carries both arms 57 and 58 therewith to thereby simultaneously open both doors 43 and 44 (see Figure 2). The simultaneous horizontal swinging movement of doors 43 and 44 may be continued until roller 55 strikes a stop on channel member 54 to thereby stop the doors in an open position as shown by the dot-dash lines in Figure 2 of the drawings. A user, housewife or cook, of the presently described oven structure may, due to the oven bottom wall being at substantially waist height, view the entire interior of oven 30 while in a standing position on floor 19 of the kitchen. When a horizontal force is imparted to either door 43 or 44, in an opposite direction to that required to open the doors, both doors will be simultaneously returned to their normal closed position, as shown in full lines in Figure 2 of the drawings, to seal against the oven sealing gasket 41 and to have their mating edges sealed by the gasket 52. The door returning movement causes the roller 55 to move rearwardly in the track or guide of channel member 54 and as the rear cammed ends of arms 57 and 58 near the jaws 63 and 64 these ends move toward one another, about pin 56, and enter the space between rollers 66 to engage and cam these rollers outwardly against the tension of spring 67. Rollers 66 ride upon the angled cam-shaped ends of links or arms 57 and 58 and under the influence of the force of spring 67 tend to be drawn farther rearwardly into the biasing means between the jaws 63 and 64. This drawing action imparted to arms 57 and 58 urges or biases doors 43 and 44 into sealing engagement with gasket 41 after the doors are closed. The biasing of doors 43 and 44, after the same are closed, prevents them from opening should the box-like structure 25 not be exactly level or during the occurrence of undue vibrations in the vicinity of the oven. Doors 43 and 44 biasingly engage the gasket 41 and are sealed along their mating edge at the joint therebetween by gasket 52 to effectively close oven 30 and prevent the escape of heated air therefrom.

It should be apparent from the foregoing that I have provided an improved wall-mounted self-contained oven assembly which, by virture of having its lower portion disposed substantially at waist height, eliminates the necessity of a user thereof to stoop or bend over to view or gain access thereto. The double door arrangement for the improved self-contained oven assembly is of special utility particularly in a substantially waist high oven assembly since they uncover the oven access opening and permit a housewife, while in a standing position on the floor of a kitchen, to view the entire interior of the oven. The eye-level height of the oven and the double doors therefor in addition to preventing hot air from flowing into the face of a housewife, when the doors are opened during a baking operation, also facilitates the placing of pans or removal of the same from the oven. The side by side horizontally swingable doors are tall and narrow and do not interfere with a person passing or working around the oven when the doors are in open position. The double doors reduce to a minimum the hazards encountered in the use of a single vertically swingable oven door. The feature of locating the operating and biasing mechanism for the simultaneously swingable doors wholly outside the oven, beyond its upper insulated wall, prevents elements of this mechanism from becoming warped or deteriorated by the high temperature within the oven. The connection of this mechanism with the doors laterally beyond their seal adjacent the front of the oven permits the extension of a seal continuously around the oven access opening in unbroken fashion. The double door arrangement together with the location of the oven as disclosed obviates the necessity of a housewife or cook reaching over a hot oven door of the vertical swinging type when such door is in a horizontal open position and permits easy access to all portions of the oven for cleaning purposes.

While the form of embodiment of the invention as herein disclosed constitutes a preferred form, it is to be understood that other forms might be adopted as may come within the scope of the claims which follow.

What is claimed is as follows:

1. In a self-contained unitary oven assembly for wall mounting in a room, an electric heating element within said oven for heating the interior thereof to a high temperature for cooking foods placed therein, said oven including a box-like structure comprising outer walls, a liner spaced from said outer walls forming inner walls of said oven and insulating material in the space between said walls, said box-like structure also comprising other walls extending from said outer walls thereof and forming a compartment therein beyond said oven, the inner bottom wall of said oven being disposed a considerable distance above the floor of the room at substantially waist height, said oven being provided with a front access opening, two doors normally sealingly engaging said oven about its access opening for closing the same, said doors being pivotally mounted upon opposite vertical sides of said oven assembly for swinging movement outwardly from said access opening whereby the entire interior of the oven may be viewed by a person in a standing position on the floor of the room, a device associated with said oven assembly and located wholly outside the same beyond said outer walls thereof, said device including movable means having a connection with each of said doors at a point laterally beyond the seal thereof with said oven, said device being so constructed and arranged as to simultaneously swing both of said doors to open said oven access opening when a force is applied to one of the doors, switch means within said compartment of said box-like structure for controlling said heating element, said switch means having an actuating member extending therefrom through the front wall of said compartment, and said insulating material between the walls of said box-like structure serving to insulate said device and said switch means from the high temperature within said oven.

2. In a self-containing unitary oven assembly for wall mounting in a room, electrical heating means for heating the interior thereof to a high temperature for cooking foods placed therein, said oven including a box-like structure comprising outer walls, an inner liner spaced from said outer walls and forming the inner walls of said oven, and insulating material in the space between said outer walls and said inner walls, the inner bottom wall of said oven being disposed a considerable distance above the floor of the room at substantially waist height, said oven being provided with a front access opening, two doors normally sealingly engaging said oven about its access opening for closing the same, said doors being pivotally mounted upon opposite vertical sides of said oven assembly for swinging movement outwardly from said access opening whereby the entire interior of the oven may be viewed by a person in a standing position on the floor of the room, a device associated with said oven assembly and located wholly outside the same beyond said outer walls thereof, said device including movable means having a connection with each of said doors at a point laterally beyond the seal thereof with said oven, said device being so constructed and arranged as to simultaneously swing both of said doors to open said access opening when a force is applied to one of the doors, and means located outside said inner liner for controlling the energization of said electrical heating means, and said insulating material between the walls of said box-like structure serving to insulate said device and said controlling means from the high temperature within said oven.

References Cited in the file of this patent

UNITED STATES PATENTS

| Number | Name | Date |
| --- | --- | --- |
| 159,524 | Morgan | Feb. 9, 1875 |
| 1,416,478 | Lamb | May 16, 1922 |
| 1,804,231 | Rantz | May 5, 1931 |
| 1,867,589 | Phillips | July 19, 1932 |
| 1,886,999 | Wilson | Nov. 8, 1932 |
| 2,000,981 | Parsons | May 14, 1935 |
| 2,101,465 | Beers | Dec. 7, 1937 |
| 2,408,295 | Cossin | Sept. 24, 1946 |
| 2,465,555 | Smith | Mar. 29, 1949 |
| 2,598,814 | McAfee | June 3, 1952 |

FOREIGN PATENTS

| Number | Country | Date |
| --- | --- | --- |
| 13,602 of 1901 | Great Britain | May 29, 1902 |